(12) United States Patent
Nakada et al.

(10) Patent No.: US 9,989,697 B2
(45) Date of Patent: Jun. 5, 2018

(54) VEHICLE LAMP

(71) Applicant: Koito Manufacturing Co., Ltd., Tokyo (JP)

(72) Inventors: Asami Nakada, Shizuoka (JP); Kensuke Hara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 18 days.

(21) Appl. No.: 14/979,714

(22) Filed: Dec. 28, 2015

(65) Prior Publication Data

US 2016/0193954 A1 Jul. 7, 2016

(51) Int. Cl.
*F21V 9/00* (2018.01)
*F21V 8/00* (2006.01)
*B60Q 1/26* (2006.01)
*F21S 8/10* (2006.01)

(52) U.S. Cl.
CPC ......... *G02B 6/0088* (2013.01); *B60Q 1/2607* (2013.01); *B60Q 1/2696* (2013.01); *F21S 43/14* (2018.01); *F21S 43/237* (2018.01); *F21S 43/245* (2018.01); *F21S 43/249* (2018.01); *F21S 48/215* (2013.01); *F21S 48/2237* (2013.01); *F21S 48/2268* (2013.01); *F21S 48/2281* (2013.01); *G02B 6/0055* (2013.01); *G02B 6/0078* (2013.01); *B60Q 2400/20* (2013.01)

(58) Field of Classification Search
CPC .. G02B 6/0088; G02B 6/0055; G02B 6/0078; G02B 4000/20; B60Q 1/2607; F21S 48/215; F21S 48/2237; F21S 48/2268; F21S 48/2281
USPC ....................................................... 362/511
See application file for complete search history.

(56) References Cited

U.S. PATENT DOCUMENTS

2008/0210154 A1* 9/2008 Nakano ................. G01D 11/28
  116/288
2011/0007518 A1* 1/2011 de Lamberterie ... B60Q 1/2607
  362/511
2013/0242583 A1* 9/2013 Tsai .......................... B62J 6/02
  362/473

FOREIGN PATENT DOCUMENTS

DE          10139578 A1    4/2003
JP        2011-129250 A    6/2011

OTHER PUBLICATIONS

An Office Action dated Nov. 1, 2017, issued from the Chinese State Intellectual Property Office of The P.R.C. (SIPO) of Chinese Patent Application No. 201511017477.1 and an EN translation thereof.

* cited by examiner

*Primary Examiner* — Elmito Breval
*Assistant Examiner* — Jessica M Apenteng
(74) *Attorney, Agent, or Firm* — Abelman, Frayne & Schwab

(57) ABSTRACT

Disclosed is a vehicle lamp including: a plurality of light source units, each of which includes a light source that emits a light and a first light guide part that internally guides the light emitted from the light source; and a second light guide part having an outer peripheral surface positioned adjacent to or connected to an outer peripheral surface of the first light guide part. One end surface of the first light guide part in a light guide direction is formed as a light incident surface of the light emitted from the light source, and the second light guide part internally guides and emits the light emitted from the outer peripheral surface of the first light guide part.

17 Claims, 10 Drawing Sheets

VEHICLE LAMP

CROSS-REFERENCE TO RELATED APPLICATIONS

This application is based on and claims priority from Japanese Patent Application No. 2015-001151, filed on Jan. 6, 2015, with the Japan Patent Office, the disclosure of which is incorporated herein in its entirety by reference.

TECHNICAL FIELD

The present disclosure relates to a technical field related to a vehicle lamp that includes a first light guide part having a light incident surface on which light emitted from a light source is incident, and a second light guide part that guides light incident from the first light guide part.

BACKGROUND

Some vehicle lamps are provided with a first light guide part that has a light incident surface on which a light emitted from a light source is incident, and a second light guide part that guides a light incident from the first light guide part (see, e.g., Japanese Patent Laid-Open Publication No. 2011-129250).

In the vehicle lamp disclosed in Japanese Patent Laid-Open Publication No. 2011-129250, one end surface of the first light guide part formed in a linear shape is formed as a light incident surface and the other end surface of the first light guide part is connected to the second light guide part formed in a predetermined shape. The first light guide part is positioned in an inclined state in relation to the second light guide part. The light source is arranged at a position facing the light incident surface of the first light guide part. In the second light guide part, a concave portion is formed to function as a lens step.

When a light is emitted from the light source, the emitted light is incident on the first light guide part from the light incident surface and is guided within the first light guide part to be incident on the second light guide part from the first light guide part. The light incident on the second light guide part is guided within the second light guide part and emitted to the outside by the lens step so that the light is emitted from the entire second light guide part.

SUMMARY

In the configuration that causes a light to be incident on the second light guide part from the first light guide part and causes the light to be emitted by the lens step as described above, the light is emitted from the entire lens step forming range. Therefore, the light emission is performed in the entire second light guide part.

However, in the configuration that causes a light to be incident on the second light guide part from the first light guide part and causes the light to be emitted as described above, uniformity in light emitting state may be degraded depending on a light guide state in the second light guide part or an incident state of the light from the first light guide part to the second light guide part. In particular, a connection portion between the first light guide part and the second light guide part is in a state before the light guide is conducted in the second light guide part and does not allow the light to be sufficiently incident on the lens step. The light emitting luminance in the connection portion may be lowered as compared to the other portions in the second light guide part. Consequently, uniformity in light emitting state may not be secured in the entire second light guide part.

Therefore, an object of the present disclosure is to secure a uniform light emitting state by overcoming the problems described above.

First, a vehicle lamp according to the present disclosure includes: a plurality of light source units, each of which includes a light source configured to emit a light and a first light guide part configured to internally guide the light emitted from the light source, one end surface of the first light guide part in a light guide direction being formed as a light incident surface of the light emitted from the light source; and a second light guide part having an outer peripheral surface positioned adjacent to or connected to an outer peripheral surface of the first light guide part, the second light guide part being configured to internally guide and emit the light emitted from the outer peripheral surface of the first light guide part.

Accordingly, the light incident on the outer peripheral surface of the second light guide part from the outer peripheral surface of the first light guide part is guided within the second light guide part to be emitted from the second light guide part.

Second, the above-described vehicle lamp according to the present disclosure may be provided with an optical member configured to control the light emitted from the second light guide part to be illuminated in a predetermined direction.

Accordingly, it is possible to control the light, which is emitted from a portion other than the light emitting surface, by the optical member.

Third, in the above-described vehicle lamp according to the present disclosure, a light reflection portion configured to reflect the light toward an inside of the second light guide part may be formed on at least one end surface of the second light guide part in the light guide direction.

Accordingly, the light guided within the second light guide part is reflected toward the inside of the second light guide part by the light reflection portion.

Fourth, in the above-described vehicle lamp according to the present disclosure, a direction control reflection portion configured to reflect the internally guided light toward the light reflection portion may be formed on another end surface of the first light guide part in the light guide direction.

Accordingly, the light reflected from the direction control reflection portion is incident on the light reflection portion and is reflected from the light reflection portion.

Fifth, the above-described vehicle lamp according to the present disclosure may be provided with a connection light guide part between the first light guide part and the second light guide part. The connection light guide part and the first light guide part may have a same thickness in a direction orthogonal to an arrangement direction of the first light guide part and the second light guide part.

Accordingly, at least a part of the light is guided within the connection light guide part, and is further guided within the second light guide part.

Sixth, the above-described vehicle lamp according to the present disclosure may be provided with a third light guide part between the second light guide part and the connection light guide part. A thickness of the third light guide part in the direction orthogonal to the arrangement direction may be thinner than the thickness of the second light guide part in the direction orthogonal to the arrangement direction.

Accordingly, at least a part of the light is guided within the connection light guide part and the third light guide part.

Seventh, in the above-described vehicle lamp according to the present disclosure, the light incident surface is positioned at another end surface side rather than at one end surface side of the second light guide part in the light guide direction, and the light source is positioned between the one end surface of the second light guide part and the light incident surface to face the light incident surface.

Accordingly, the light source is not positioned outside the second light guide part in the light guide direction.

Eighth, a vehicle lamp according to another aspect of the present disclosure includes: a light source configured to emit a light; a first light guide part configured to internally guide the light emitted from the light source, one end surface of the first light guide part in a light guide direction being formed as a light incident surface of the light emitted from the light source and another end surface of the first light guide part in the light guide direction being formed as a light emitting surface configured to emit the light; a connection light guide part having an outer peripheral surface positioned adjacent to or connected to the light emitting surface, the connection light guide part being configured to internally guide the light emitted from the light emitting surface; and a second light guide part positioned opposite to the first light guide part with the connection light guide part being interposed therebetween, the second light guide part being configured to internally guide and emit the light emitted from the outer peripheral surface of the connection light guide part.

Accordingly, the light, which has been incident on the connection light guide part from the another end surface of the first light guide part, is guided within the connection light guide part, and the light, which has been incident on the second light guide part from the connection light guide part, is guided within the second light guide part to be emitted from the second guide part.

Ninth, in the above-described vehicle lamp according to another aspect of the present disclosure, a light reflection portion configured to reflect the light toward the inside of the second light guide part may be formed on at least one end surface of the second light guide part and the connection light guide part in the light guide direction.

Accordingly, the light guided within the second light guide part and the connection light guide part is reflected toward the inside of the second light guide part by the light reflection portion.

Tenth, in the above-described vehicle lamp according to another aspect of the present disclosure, a plurality of first light guide parts may be provided. In at least one of the first light guide parts, the light incident surface may be positioned closer to the light reflection portion than the light emitting surface, and in at least one of other first light guide parts, the light emitting surface may be positioned closer to the light reflection portion than the light incident surface.

Accordingly, a light reflected from the light reflection portion and incident on the second light guide part exists.

Eleventh, the above-mentioned vehicle lamp according to another aspect of the present disclosure may be provided with a third light guide part between the second light guide part and the connection light guide part. A thickness of the third light guide part in the direction orthogonal to the arrangement direction may be thinner than the thickness of the second light guide part in the direction orthogonal to the arrangement direction.

Accordingly, at least a part of the light is guided within the connection light guide part and the third light guide part.

According to the present disclosure, the light, which has been incident on the outer peripheral surface of the second light guide part from the outer peripheral surface of the first light guide part is guided within the second light guide part to be emitted from the second light guide part. In addition, the light, which has been incident on the connection light guide part from the another end surface of the first light guide part, is guided within the connection light guide part, and the light, which has been incident on the second light guide part from the connection light guide part, is guided within the second light guide part, and emitted from the second light guide part. Therefore, a uniform light emitting state can be secured.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 illustrates an exemplary embodiment of a vehicle lamp of the present disclosure together with FIGS. 2 to 17, in which FIG. 1 is a schematic perspective view of the vehicle lamp.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of a vehicle lamp of the present disclosure will be described with reference to the accompanying drawings.

The exemplary embodiment described below corresponds to that applied to a vehicle lamp that illuminates light forward. However, the present disclosure is widely applicable to various vehicle lamps that illuminate light sideward or backward, in addition to the vehicle lamp that illuminates the light forward.

For example, the present disclosure is widely applicable to various lamps such as, for example, a headlamp, a tail lamp, a clearance lamp, a turn signal lamp, a stop lamp, a daytime running lamp, a cornering lamp, a hazard lamp, a position lamp, a back lamp, and a fog lamp, or various combination lamps in which functions of two or more of the above-mentioned lamps are combined.

<Overall Configuration>

The vehicle lamp 1 is mounted and arranged at, for example, each of the left and right ends in the front end part of a vehicle body (not illustrated).

Figure 1:
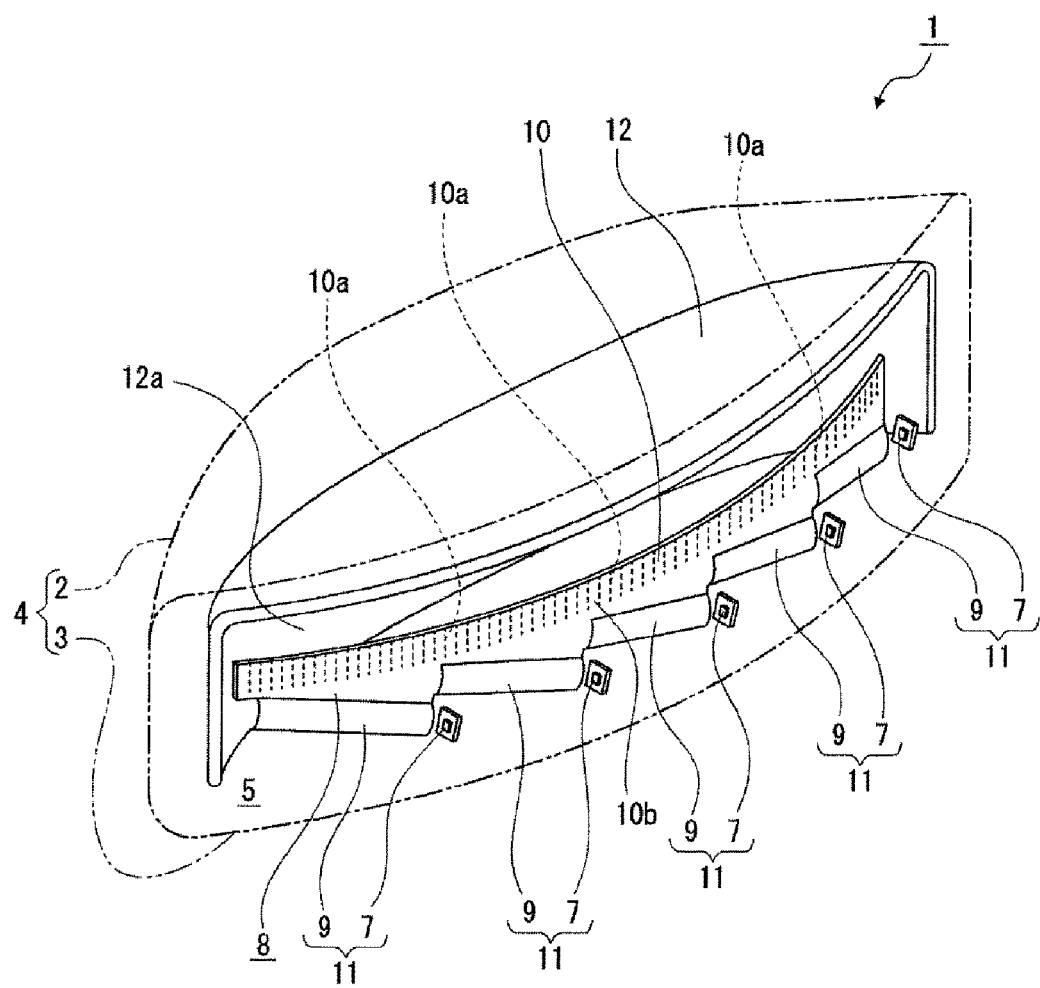
Figure 2:
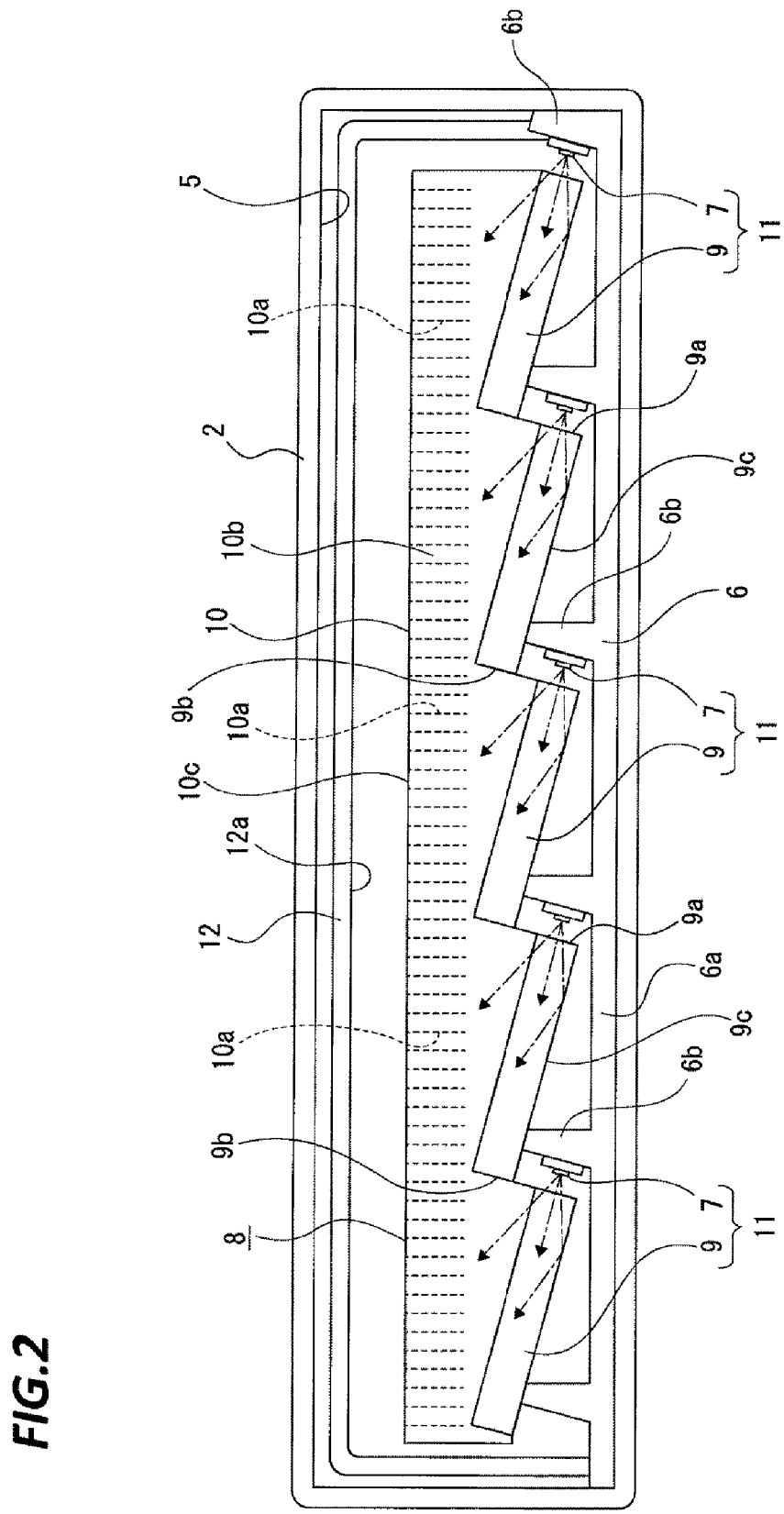
FIG. 2 is a schematic front view illustrating the vehicle lamp in a state where a cover is removed.

The vehicle lamp 1 is provided with a lamp housing 2 that has an concave portion opened forward, and a cover 3 that blocks the opening of the lamp housing 2 (see, e.g., FIGS. 1 and 2). An outer case 4 of the vehicle lamp is configured by the lamp housing 2 and the cover 3, and the inner space of the outer case 4 of the vehicle lamp is formed as a lamp chamber 5.

In the lamp chamber 5, a light source mounting base 6 is arranged in, for example, the lower end portion thereof (see, e.g., FIG. 2). The light source mounting base 6 includes a flat base plate portion 6*a* that is directed in a vertical direction, and mounting protrusions 6*b*, 6*b*, . . . , 6*b* protruding upward from the base plate portion 6*a*. The mounting protrusions 6*b*, 6*b*, . . . , 6*b* are positioned to be spaced apart from each other. Light sources 7, 7, . . . , 7 are mounted on the mounting protrusions 6*b*, 6*b*, . . . , 6*b*, respectively.

As a light source 7, for example, a light emitting diode (LED) is used. The light source 7 is arranged such that its light emitting direction is directed sideward in an oblique upward direction.

In the lamp chamber 5, a light guide body 8 is arranged (see, e.g., FIGS. 1 and 2). The light guide body 8 includes first light guide parts 9, 9, . . . , 9 and a second light guide part 10. The light guide body 8 is formed in a shape following, for example, a side portion in the front end part of the vehicle, and formed in a shape that is inclined to be displaced rearward from the inside toward the outside of the vehicle. However, in each of the drawings following FIG. 2 and in the following description, it is assumed that the light guide body is formed in a shape that is directed in back and forth directions for the convenience of understanding of the description.

The first light guide parts 9, 9, . . . , 9 are provided to be arranged side by side on the left and right sides, and each of the first light guide parts 9, 9, . . . , 9 is formed in a columnar shape that is inclined in the vertical direction. In each first light guide part 9, one end surface in the longitudinal direction (in the left and right directions) is formed as a light incident surface 9*a*, and the other end surface in the longitudinal direction is formed as a light emitting surface 9*b*. The first light guide part 9 is positioned such that the light incident surface 9*a* faces a light source 7.

The first light guide part 9 is configured such that a light guide direction for guiding a light becomes a longitudinal direction that is a direction of interconnecting the light incident surface 9*a* and the light emitting surface 9*b*.

The inclined angle of the first light guide parts 9 is set to be 5° to 45° in relation to a horizontal direction. The inclined direction may be set to be 10° to 30°, for example, 15°.

The second light guide part 10 is formed in a substantially plate-like shape that is directed in, for example, the back and forth directions, and is connected with each of the upper end portions in the outer peripheral surfaces 9*c*, 9*c*, . . . , 9*c*, and the light emitting surfaces 9*b*, 9*b*, . . . , 9*b* of the first light guide parts 9, 9, . . . , 9. On the rear surface of the second light guide part 10, reflection steps 10*a*, 10*a*, . . . , 10*a* are formed side by side in the left and right directions and in the front surface of the second light guide part 10, a portion in front of the reflection steps 10*a*, 10*a*, . . . , 10*a* is formed as a light emitting surface 10*b*.

On the second light guide part 10, the surface other than the left and right end surfaces becomes an outer peripheral surface 10*c*, and the light guide direction for guiding a light becomes a longitudinal direction (left and right directions) which is a direction of interconnecting the left and right end surfaces.

Meanwhile, while an example in which the outer peripheral surface 9*c* of each first light guide part 9 and the outer peripheral surface (lower surface) 10*c* of the second light guide part 10 are connected to each other has been described above, the outer peripheral surface 9*c* of the first light guide part 9 and the outer peripheral surface 10*c* of the second light guide part 10 may be positioned to be adjacent to each other.

A light source unit 11 is configured by a first light guide part and a light source 7 positioned to face the light incident surface 9*a* of a first light guide part 9. Accordingly, the vehicle lamp 1 is provided with a plurality of light source units 11, 11, . . . , 11.

In the lamp chamber 5, for example, a reflector 12 is arranged as an optical member. The reflector 12 has an inner surface that is formed as a reflection surface 12*a*. The reflector 12 is formed in a shape opened at least forwardly, and is arranged to cover the light guide body 8.

When lights are emitted from the light sources 7, 7, . . . , 7, respectively, the emitted lights enter the inside of the first light guide parts 9, 9, . . . , 9 from the light incident surfaces 9*a*, 9*a*, . . . , 9*a* of the first light guide parts 9, 9, . . . , 9, respectively. The lights, which have entered the inside of the first light guide parts 9, are guided to the light emitting surfaces 9*b*, 9*b*, . . . , 9*b*, and are incident on the second light guide part 10 from the light emitting surfaces 9*b*, 9*b*, . . . , 9*b*. In that event, a part the lights, which has entered the inside of the first light guide parts 9, 9, . . . , 9, also reaches the outer peripheral surfaces 9*c*, 9*c*, . . . , 9*c* and is also incident on the second light guide part 10 from the outer peripheral surfaces 9*c*, 9*c*, . . . , 9*c*.

The lights, which have been incident on the second light guide part 10 from the light emitting surfaces 9*b*, 9*b*, . . . , 9*b* and the outer peripheral surfaces 9*c*, 9*c*, . . . , 9*c* of the first light guide parts 9, 9, . . . , 9 are internally reflected within the second light guide part 10 to be guided in the left and right directions, and reflected from the reflection steps 10*a* to be emitted forward from the light emitting surface 10*b*. In that event, the lights are also emitted from a surface other than the light emitting surface 10*b* of the second light guide part 10, and the emitted lights are reflected from the reflection surface 12*a* of the reflector 12 to be emitted forward. Accordingly, the light emitted from the light emitting surface 10*b* and the light reflected from the reflection surface 12*a* of the reflector 12 are illuminated forward through the cover 3.

As described above, the vehicle lamp 1 includes a plurality of light source units 11, 11, . . . , 11, each of which includes a light source 7, 7, . . . , 7 and a first light guide part 9, 9, . . . , 9 having a light incident surface 9a, 9a, . . . , 9a formed thereon, and a second light guide part 10, of which the outer peripheral surface 10c is positioned adjacent to or connected to the outer peripheral surfaces 9c, 9c, . . . , 9c of the first light guide parts 9, 9, . . . , 9, to internally guide and emit the lights emitted from the outer peripheral surfaces 9c, 9c, . . . , 9c.

Accordingly, the lights, which have been incident on the second light guide part 10 from the outer peripheral surfaces 9c, 9c, . . . , 9c of the first light guide parts 9, 9, . . . , 9, are guided within the second light guide part 10 and emitted from the second light guide part 10. Therefore, a uniform light emitting state in the second light guide part 10 can be secured.

In addition, the lights, which have been incident on the second light guide part 10 from the light emitting surfaces 9b, 9b, . . . , 9b of the first light guide parts 9, 9, . . . , 9, are also guided within the second light guide part 10 and emitted from the second light guide part 10. Therefore, a further uniform light emitting state in the second light guide part 10 can be secured.

Further, the vehicle lamp 1 is provided with an optical member, i.e. the reflector 12, so that the light emitted from a portion other than the light emitting surface 10b may be used as a light illuminated forward by the reflector 12. Therefore, the degree of flexibility in designing and the utilization efficiency of the light can be improved by the control of light.

Meanwhile, an example in which the reflector 12 is provided as an optical member has been described above. However, the optical member is not limited to the reflector 12 and other types of optical members may be used as long as the optical members may control and illuminate the light in a predetermined direction. For example, other light guide bodies or shades may be used as the optical member.

In addition, an example in which the second light guide part 10 is formed in a substantially plate-like shape directed in a back-and-forth direction has been described above. However, the second light guide part 10 may formed in other shapes without being limited to the substantially plate-like shape. For example, the second light guide part 10 may be formed in, for example, a substantially columnar shape.

In a configuration in which a plurality of light source units 11, 11, . . . , 11 are arranged side by side as in the above-mentioned vehicle lamp 1, it is possible to form a so-called sequential light emitting state in which that the lights are sequentially emitted from the light sources 7, 7, . . . , 7 so that the light emitting portions are sequentially changed and thus a light is visually recognized as if it is flowing (see, e.g., FIGS. 3A to 3E).

Figure 3:
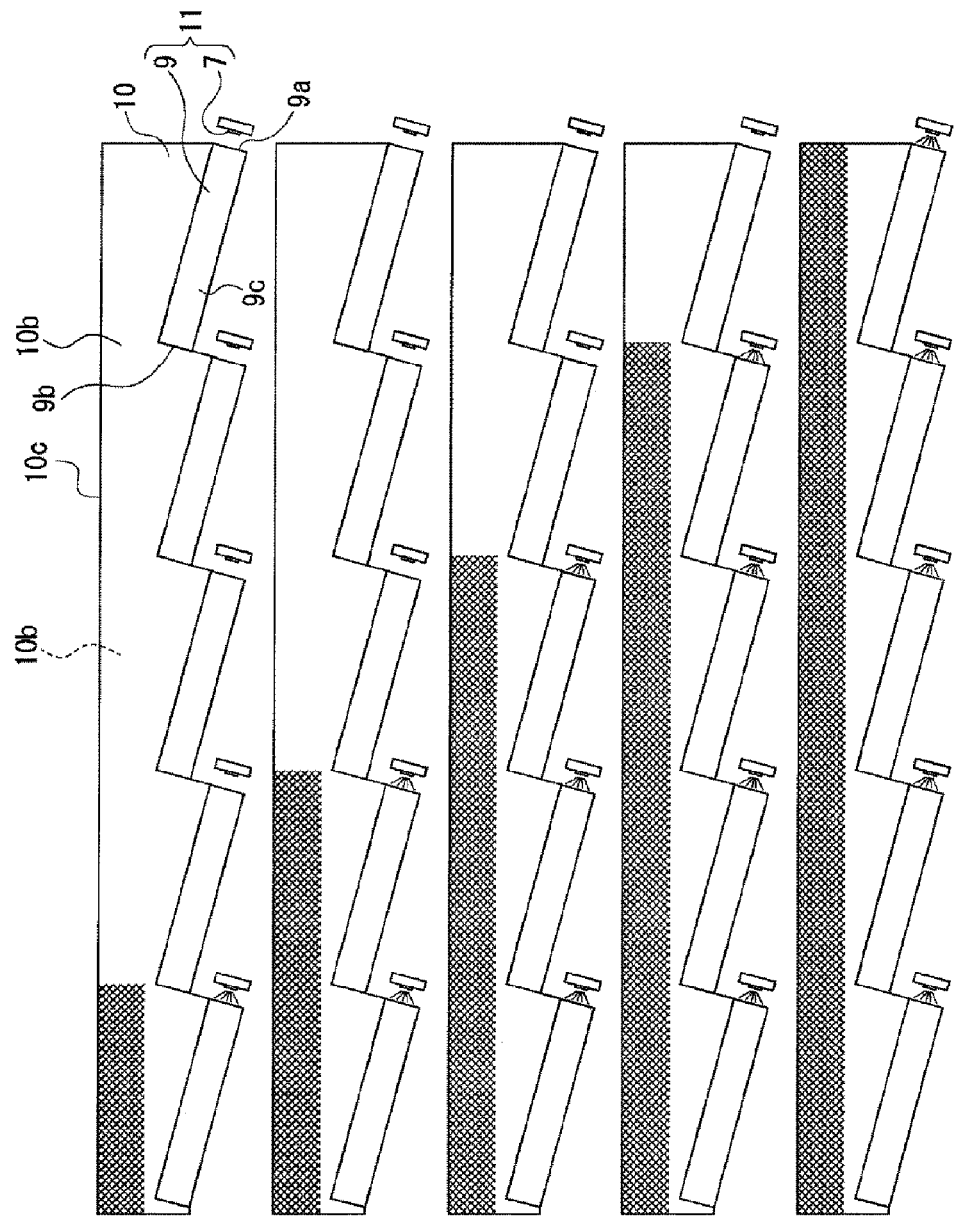
FIGS. 3A to 3E are views illustrating a state in which a sequential light emitting state is formed.

For example, first, when the light is emitted from the leftmost light source 7, the light is emitted from the left end portion in the light emitting surface 10b of the second light guide part 10 (see, e.g., FIG. 3A). Subsequently, when the light is emitted from the second light source 7 from the left side in the state where the light has been emitted from the leftmost light source 7, the light emitting range in the light emitting surface 10b of the second light guide part 10 is widened rightward (see, e.g., FIG. 3B). Thereafter, the light is emitted from the light sources 7, 7, . . . , 7 sequentially from left to right, so that the light emitting range is sequentially widened rightward (see, e.g., FIGS. 3C to 3E), and as a result, the sequential light emitting state in which the light is visually recognized as if it is flowing from left to right is formed.

In forming such a sequential light emitting state, the light emission of one cycle from the leftmost light source 7 to the rightmost light source 7 may be continuously performed by setting the light emission from the leftmost light source 7 to the rightmost light source 7 to be performed within, for example, 0.2 sec. By performing the continuous light emission, the vehicle lamp 1 may be suitably used as, for example, a turn signal lamp.

[Modification of Light Guide Body]

Hereinafter, each modification of the light guide body will be described. Each modification to be described below is the same as the exemplary embodiment described above in that they include first light guide parts and a second light guide part like the light guide body 8 described above, and is different from the exemplary embodiment described above in that the positional relationship between the first light guide parts and the second light guide part is different from that in the light guide body 8, the shapes or configurations of the first light guide parts and the second light guide part are different from those in the light guide body 8, and another part exists in addition to the first light guide parts and the second light guide part. Accordingly, in the following descriptions of each modification, only the different portions compared to the light guide body 8 will be described in detail, and the descriptions of the other portions will be omitted while assigning the same reference numerals to the same components as those in the light guide body 8.

Meanwhile, even in a vehicle lamp including a light guide body according to each modification described below, an optical member such as, for example, the reflector 12, may be provided like the vehicle lamp including the above-described light guide body 8. In addition, the sequential light emitting state may be formed in a case where a plurality of light source units are arranged side by side.

<First Modification>

Figure 4:
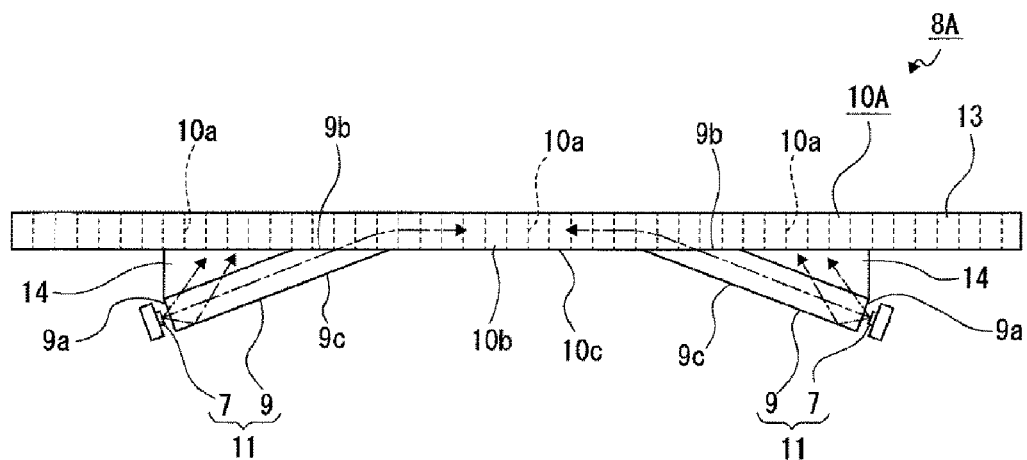
FIG. 4 is a front view illustrating a first modification of a light guide body.

First, a light guide body 8A according to a first modification will be described (see, e.g., FIG. 4).

The light guide body 8A includes first light guide parts 9, 9 and a second light guide part 10A. A light source unit 11 is constituted by a first light guide part 9 and a light source 7. The first light guide part 9 of one side includes a light emitting surface 9b positioned on the left and a light incident surface 9a positioned on the right, and the first light guide part 9 of the other side includes a light emitting surface 9b positioned on the right and a light incident surface 9a positioned on the left.

The second light guide part 10A includes a body portion 13 that extends in the left and right directions, and connection portions 14, 14 protruding downwardly from the body portion 13. The connection portions 14, 14 are positioned to be spaced apart from each other in the left and right directions. The body portion 13 is formed in, for example, a columnar shape or a plate-like shape, and each of the connection portions 14, 14 is formed in, for example, a plate-like shape or a columnar shape.

The second light guide part 10A includes reflection steps 10a, 10a, . . . , 10a that are formed side by side in the left and right directions on the rear surface of the body portion 13, and in the front surface of the body portion 13, a portion in front of the reflection steps 10a is formed as a light emitting surface 10b.

The lower surfaces of the connection portions 14, 14 are connected to the upper end portions of the outer peripheral surfaces 9c, 9c of the first light guide parts 9, 9, respectively.

Meanwhile, the outer peripheral surfaces 9c, 9c of the first light guide parts 9, 9 may be positioned adjacent to the lower surfaces of the connection portions 14, 14, respectively.

The light sources 7, 7 are positioned between the opposite ends in the longitudinal direction of the second light guide part 10A (in the left and right directions).

When lights are emitted from the light sources 7, 7, respectively, the emitted lights enter the inside of the first light guide parts 9, 9 from the light incident surfaces 9a, 9a of the first light guide parts 9, 9, respectively. The lights, which have entered the inside of the first light guide parts 9, 9, are incident on the body portion 13 of the second light guide part 10A from the light emitting surfaces 9b, 9b as well as incident on the body portion 13 of the second light guide part 10A from the outer peripheral surfaces 9c, 9c through the connection portions 14, 14, respectively.

The lights, which have been incident on the body portion 13 from the light emitting surfaces 9b, 9b and the outer peripheral surfaces 9c, 9c of the first light guide parts 9, 9 are internally reflected within the second light guide part 10A to be guided in the left and right directions, and are reflected from the reflection steps 10a, 10a, . . . , 10a to be emitted forward from the light emitting surface 10b.

As described above, even in the light guide body 8A, the lights, which have been incident on the second light guide part 10A from the outer peripheral surfaces 9c, 9c of the first light guide parts 9, 9 are guided within the second light guide part 10A and emitted from the second light guide part 10A. Therefore, a uniform light emitting state in the second light guide part 10A can be secured.

In addition, the light sources 7, 7 are positioned between the opposite ends in the longitudinal direction of the second light guide part 10A rather than being positioned on the opposite sides in the longitudinal direction of the second light guide part 10A. The size of the vehicle lamp 1 can be reduced in the longitudinal direction of the second light guide part 10A.

<Second Modification>

Figure 5:
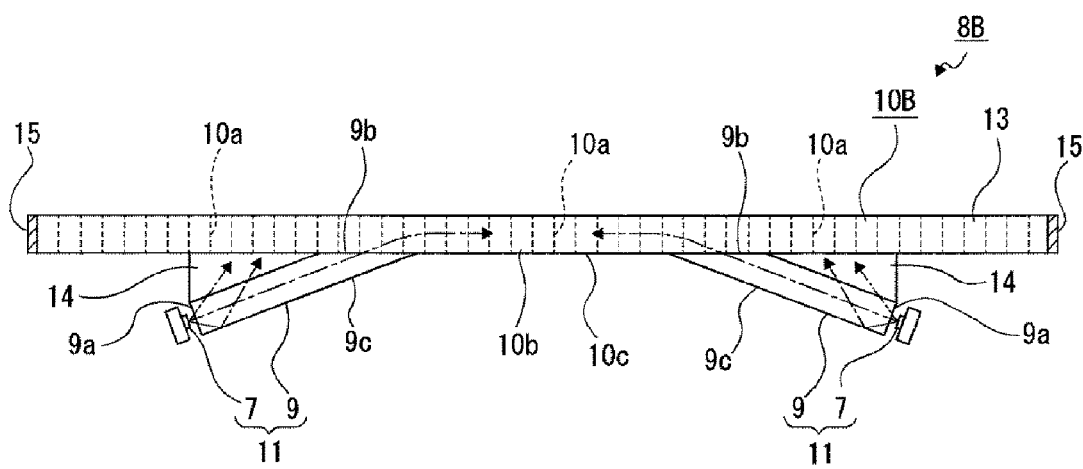
FIG. 5 is a front view illustrating a second modification of the light guide body.

Next, a light guide body 8B according to a second modification will be described (see, e.g., FIG. 5).

The light guide body 8B includes a light reflection portion that is formed on at least one end surface in the light guide direction of the body portion 13 of the light guide body 8A (left and right directions) according to the first modification. The light reflection portion reflects the light toward the inside of the body portion 13.

The light guide body 8B includes first light guide parts 9 and a second light guide part 10B. The second light guide part 10B includes a body portion 13 and connection portions 14, 14. On the left and right end surfaces of the body portion 13, light reflection portions 15, 15 are formed, respectively. Each of the light reflection portions 15, 15 is formed by, for example, depositing aluminum or the like, or attaching a triangular step or a reflection member.

In addition, the light reflection portion 15 may be formed on one of the left and right end surfaces in the body portion 13.

When lights are emitted from the light sources 7, 7, respectively, the emitted lights enter the inside of the first light guide parts 9, 9 from the light incident surfaces 9a of the first light guide parts 9, respectively. The lights, which have entered the inside of the first light guide parts 9, are incident on the body portion 13 of the second light guide part 10B from the light emitting surfaces 9b, respectively, as well as incident on body portion 13 of the second light guide part 10B from the outer peripheral surfaces 9c, 9c through the connection portions 14, 14, respectively.

The lights, which have been incident on the body portion 13 from the light emitting surfaces 9b, 9b and the outer peripheral surfaces 9c, 9c of the first light guide parts 9, are internally reflected within the second light guide part 10B to be guided in the left and right directions, and are reflected by the reflection steps 10a, 10a, . . . , 10a to be emitted forward from the light emitting surface 10b. In that event, the lights directed to the left and right ends of the body portion 13 are reflected from the light reflection portions 15, 15 to be repeatedly guided in the left and right directions within the body portion 13.

As described above, in the light guide body 8B, since the lights, which have been incident on the second light guide part 10B from the outer peripheral surfaces 9c, 9c of the first light guide parts 9, are guided within the second light guide part 10B to be emitted from the second light guide part 10B, a uniform light emitting state in the second light guide part 10B can be secured.

In addition, since the lights guided within the body portion 13 in the second light guide part 10B are reflected toward the inside of the body portion 13 by the light reflection portions 15, the lights are not emitted from the opposite end surfaces of the body portion 13. Therefore, the utilization efficiency of the lights can be improved.

Further, the configuration having the light reflection portion 15 is also applicable to the light guide body 8.

<Third Modification>

Figure 6:
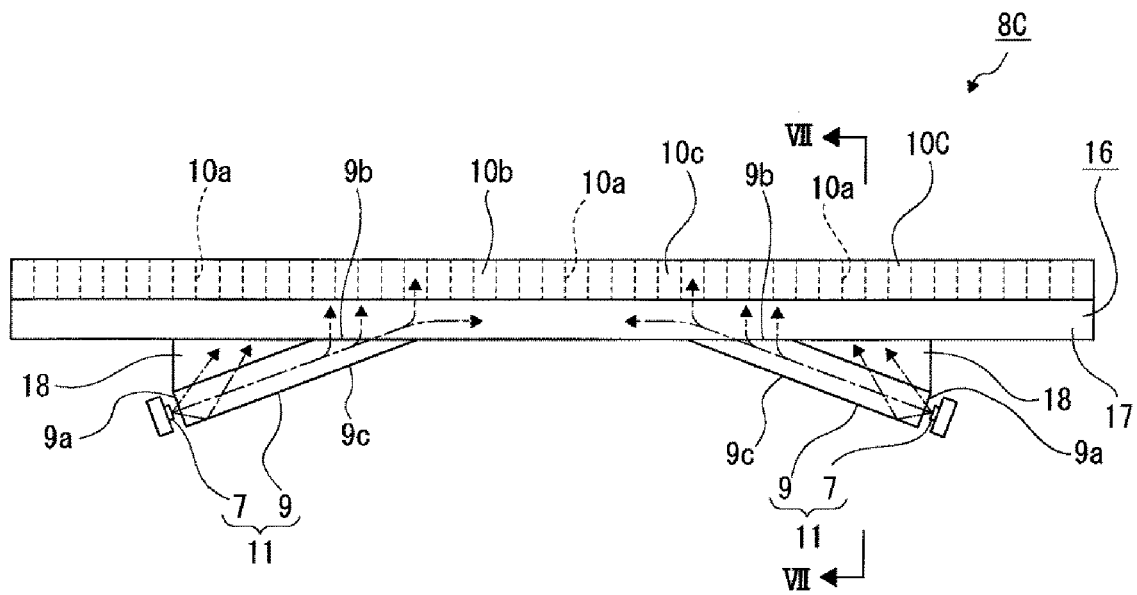
FIG. 6 is a front view illustrating a third modification of the light guide body.
Figure 7:
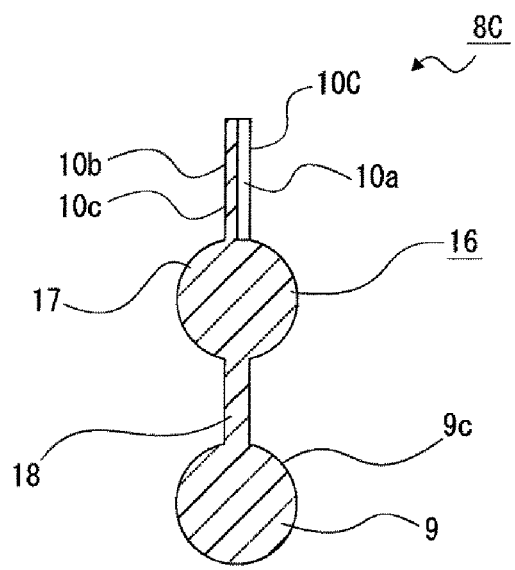
FIG. 7 is an enlarged sectional view of the third modification of the light guide body which is taken along line VII-VII in FIG. 6.

Next, a light guide body 8C according to a third modification will be described (see, e.g., FIGS. 6 and 7).

The light guide body 8C includes first light guide parts 9, 9, a second light guide part 10C, and a connection light guide part 16. A light source unit 11 is constituted by a first light guide part 9 and a light source 7. The first light guide part 9 of one side includes a light emitting surface 9b positioned on the left and a light incident surface 9a positioned on the right, and the first light guide part 9 of the other side includes a light emitting surface 9b positioned on the right and a light incident surface 9a positioned on the left.

The second light guide part 10C is formed in a plate-like shape that extends in the left and right directions, and positioned above the first light guide parts 9, 9 to be spaced apart from the first light guide parts 9, 9. On the rear surface of the second light guide part 10C, reflection steps 10a, 10a, . . . , 10a are formed side by side in the left and right directions, and in the front surface of the second light guide part 10C, a portion in front of the reflection steps 10a is formed as a light emitting surface 10b.

The connection light guide part 16 is positioned between the first light guide parts 9, 9 and the second light guide part 10C. The connection light guide part 16 includes a body portion 17 and connection portions 18, 18 protruding downwardly from the body portion 17. The connection portions 18, 18 are spaced apart from each other in the left and right directions. The body portion 17 is formed in a columnar shape that extends in the left and right directions, and each of the connection portions 18, 18 is formed in, for example, a plate-like shape. The body portion 17 has an outer diameter that is equal to the outer diameter of the first light guide parts 9, 9. With respect to the thickness in a direction orthogonal to the alignment direction of the first light guide parts 9, 9 and the second light guide part 10C (in the back and forth directions), the connection portions 18, 18 are formed to be thinner than the first light guide parts 9, 9.

The upper surface of the body portion 17 is connected to the second light guide part 10C, and the light emitting surfaces 9b, 9b of the first light guide parts 9, 9 are connected to the lower surface of the body portion 17.

The lower surfaces of the connection portions 18, 18 are connected to the upper end portions in the outer peripheral surfaces 9c, 9c of the first light guide parts 9, 9, respectively. In addition, the outer peripheral surfaces 9c, 9c of the first light guide parts 9, 9 and the lower surface of the connection portion 18 may be positioned adjacent to each other.

When lights are emitted from the light sources 7, 7, respectively, the emitted lights enter the inside of the first light guide parts 9, 9 from the light incident surfaces 9a of the first light guide parts 9, 9, respectively. The lights, which have entered the inside of the first light guide parts 9, 9, are incident on the second light guide part 10C from the light emitting surfaces 9b through the body portion 17 of the connection light guide part 16 as well as incident on the second light guide part 10C from the outer peripheral surfaces 9c, 9c through the connection portions 18, 18 and the body portion 17 of the connection light guide part 16. In that event, at least a part of the lights directed toward the second light guide part 10C from the first light guide parts 9 is guided within the body portion 17 of the connection light guide part 16 in the left and right directions to be incident on the second light guide part 10C.

The lights, which have been incident on the second light guide part 10C from the light emitting surfaces 9b, 9b and the outer peripheral surfaces 9c, 9c of the first light guide parts 9, 9 are internally reflected within the second light guide part 10C to be guided in the left and right directions, and are reflected from the reflection steps 10a to be emitted forward from the light emitting surface 10b.

As described, even in the light guide body 8C, the lights, which have entered the second light guide part 10C from the outer peripheral surfaces 9c, 9c of the first light guide parts 9, 9 are guided within the second light guide part 10C and emitted from the second light guide part 10C. Therefore, a uniform light emitting state in the second light guide part 10C can be secured.

In addition, while the amount of light in the vicinity of the light incident surfaces 9a, 9a of the first light guide parts 9, 9 is large when the lights are emitted from the light sources 7, 7, the connection portions 18, 18 are formed to be thinner than the first light guide parts 9, 9 with respect to the thickness in the direction orthogonal to the alignment direction of the first light guide parts 9, 9 and the second light guide part 10C in the light guide body 8C, as described above. Accordingly, with respect to the light in the vicinity of the light incident surfaces 9a, 9a, the amount of light that is incident on the second light guide part 10C from the outer peripheral surfaces 9c, 9c may be reduced. Therefore, a more uniform light emitting state in the second light guide part 10C can be secured.

In addition, in the light guide body 8C, the body portion 17 of the connection light guide part 16, which has an outer diameter equal to that of the first light guide parts 9, 9, is provided between the first light guide parts 9, 9 and the second light guide part 10C.

Accordingly, at least a part of the light is guided in the left and right directions within the body portion 17 and also guided in the left and right directions within the second light guide part 10C. Therefore, the uniformity of the light emitted forward from the light emitting surface 10b can be improved.

Meanwhile, a configuration having the light reflection portions 15 used in the light guide body 8B is also applicable to the light guide body 8C. In addition, an example in which the second light guide part 10C is formed in a plate-like shape and the connection light guide part 16 is formed in a columnar shape has been described above. On the contrary, however, a configuration in which the second light guide part 10C is formed in a columnar shape and the connection light guide part 16 is formed in a plate-like shape is also available.

<Fourth Modification>

Figure 8:
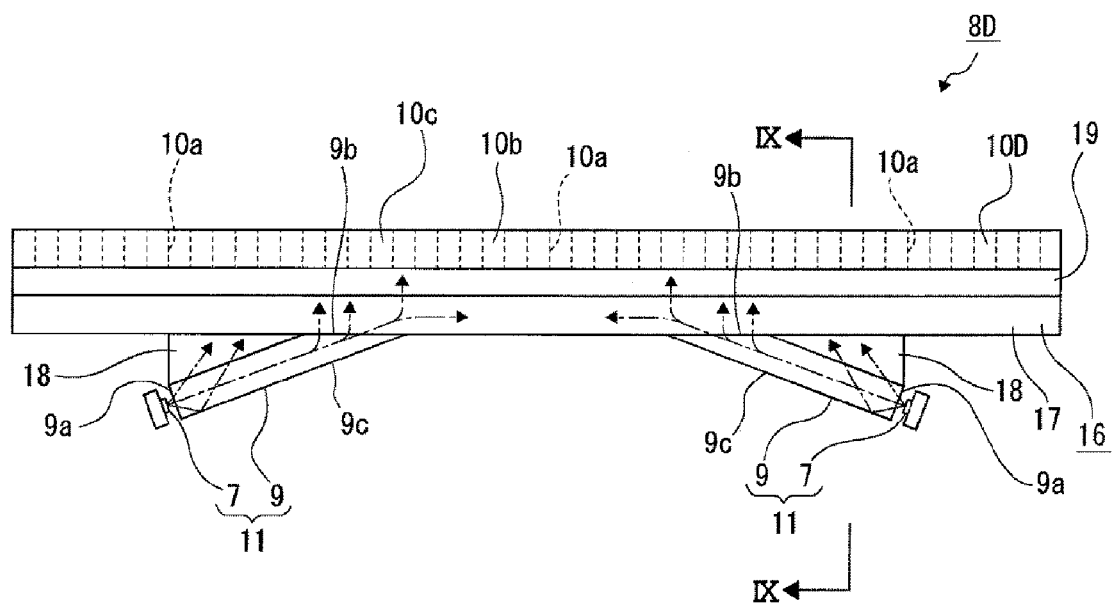
FIG. 8 is a front view illustrating a fourth modification of the light guide body.
Figure 9:
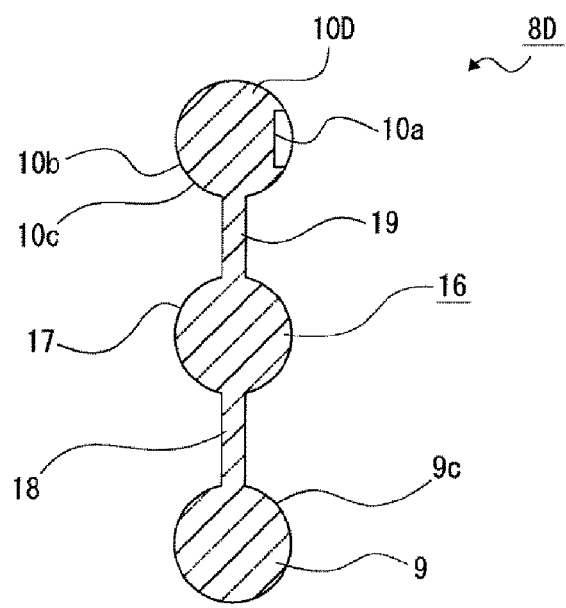
FIG. 9 is an enlarged sectional view of the fourth modification of the light guide body which is taken along line IX-IX in FIG. 8.

Next, a light guide body 8D according to a fourth modification will be described (see, e.g., FIGS. 8 and 9).

The light guide body 8D includes first light guide parts 9, 9, a second light guide part 10D, a connection light guide part 16, and a third light guide part 19. A light source unit 11 is constituted by a first light guide part 9 and a light source 7. The first light guide part 9 of one side includes a light emitting surface 9b positioned on the left and a light incident surface 9a positioned on the right, and the first light guide part 9 of the other side includes a light emitting surface 9b positioned on the right and a light incident surface 9a positioned on the left.

The second light guide part 10D is formed in a columnar shape that extends in the left and right directions, and provided above the first light guide parts 9 to be spaced apart from the first light guide parts 9, 9. On the rear surface of the second light guide part 10D, reflection steps 10a, 10a . . . , 10a are formed side by side in the left and right directions, and in the front surface of the second light guide part 10D, a portion in front of the reflection steps 10a is formed as a light emitting surface 10b.

The connection light guide part 16 is positioned between the first light guide parts 9, 9 and the second light guide part 10D. The connection light guide part 16 includes a body portion 17 and connection portions 18, 18.

The lower surface of the body portion 17 is connected to the light emitting surfaces 9b of the first light guide parts 9. The lower surfaces of the connection portions 18, 18 are connected to the upper end portions of the outer peripheral surfaces 9c, 9c of the first light guide parts 9, 9, respectively. Meanwhile, the outer peripheral surfaces 9c, 9c of the first light guide parts 9, 9 may be positioned adjacent to the lower surfaces of the connection portions 18, 18, respectively.

The third light guide part 19 is formed in a plate-like shape that extends in the left and right directions, and is positioned between the second light guide part 10D and the connection light guide part 16. The upper surface of the third light guide part 19 is connected to the lower surface of the second light guide part 10D, and the lower surface of the third light guide part 19 is connected to the upper surface of the body portion 17 in the connection light guide part 16.

The thickness of the third light guide part 19 in the back and forth directions is thinner than the thickness of the second light guide part 10D in the back and forth directions.

When the lights are emitted from the light sources 7, 7, respectively, the emitted lights enter the inside of the first light guide parts 9, 9 from the light incident surfaces 9a, 9a of the first light guide parts 9, 9, respectively. The lights, which have entered the inside of the first light guide parts 9, 9 from the light incident surfaces 9a, 9a, are incident on the second light guide part 10D from the light emitting surfaces 9b through the body portion 17 of the connection light guide part 16 and the third light guide part 19, as well as incident on the second light guide part 10D from the outer peripheral surfaces 9c, 9c of the first light guide parts 9, 9 through the connection portions 18, 18 and the body portion 17 of the connection light guide part 16 and the third light guide part 19. In that event, at least a part of the lights directed toward the second light guide part 10D from the first light guide parts 9, 9 is guided in the left and right directions within the body portion 17 of the connection light guide part 16 and the third light guide part 19 to be incident on the second light guide part 10D.

The lights, which have been incident on the second light guide part 10D from the light emitting surfaces 9b, 9b and the outer peripheral surfaces 9c, 9c of the first light guide parts 9, 9, are internally reflected within the second light guide part 10D to be guided in the left and right directions, and reflected from the reflection steps 10a, 10a, . . . , 10a to be emitted forward from the light emitting surface 10b.

In this way, even in the light guide body 8D, the lights, which have been incident on the second light guide part 10D from the outer peripheral surfaces 9c, 9c of the first light guide parts 9, 9, are internally guided within the second light guide part 10D to be emitted from the second light guide part 10D. Therefore, a uniform light emitting state in the second light guide part 10D can be secured.

In addition, in the light guide body 8D, a third light guide part 19 is provided between the second light guide part 10D and the connection light guide part 16, and the thickness of the third light guide part 19 in the back and forth directions is thinner than the thickness of the second light guide part in the back and forth directions.

Accordingly, the lights are at least partially guided in the left and right directions within the connection light guide part 16 and the third light guide part 19 and further guided in the left and right directions within the second light guide part 10D. Therefore, the uniformity of the light emitted forward from the light emitting surface 10b can be improved.

Meanwhile, in the case of a configuration in which the third light guide part 19 is not provided and the second light guide part 10D and the connection light guide part 16 are connected to each other, a predetermined width is required in the connection portion between the second light guide part 10D and the connection light guide part 16. Thus, it is difficult to maintain the cross-sectional shapes of the second light guide part 10D and the connection light guide part 16 in a circular shape in unison.

Accordingly, by providing the third light guide part 19 between the second light guide part 10D and the connection light guide part 16, the cross-sectional shapes of the second light guide part 10D and the connection light guide part 16 may be maintained in a circular shape in unison. Thus, the light guide efficiency of the second light guide part 10D and the connection light guide part 16 may be enhanced so that the optical performance can be improved.

Meanwhile, the configuration having the light reflection portion 15 used in the light guide body 8B is also applicable to the light guide body 8D.

<Fifth Modification>

Figure 10:
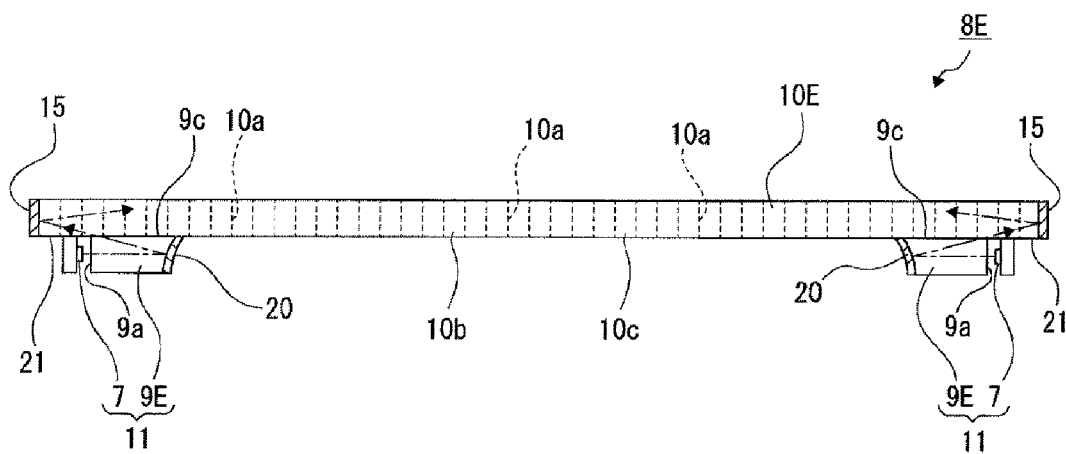
FIG. 10 is a front view illustrating a fifth modification of the light guide body.

Next, a light guide body 8E according to a fifth modification will be described (see, e.g., FIG. 10).

The light guide body 8E includes first light guide parts 9E, 9E and a second light guide part 10E.

The first light guide parts 9E, 9E are provided to be spaced apart from each other in the left and right directions, and are formed in a substantially columnar shape that extends in the left and right directions. One end surface of each first light guide part 9E in the longitudinal direction (left and right directions) is formed as a light incident surface 9a. The first light guide part 9E is positioned such that the light incident surface 9a faces a light source 7. The other end surface of the first light guide part 9E is formed as an inclined surface that comes closer to the light incident surface 9a as going downward.

On the other end surface of the first light guide part 9E, a direction control reflection portion 20 is formed. The direction control reflection portion 20 is formed by, for example, depositing aluminum or the like, or attaching a triangular step or a reflection member.

The second light guide part 10E is formed in a plate-like shape that is directed in, for example, back and forth directions and extends in the left and right directions. On the left and right end surfaces of the second light guide part 10E, light reflection portions 15, 15 are formed, respectively. Each light reflection portion 15 is formed by, for example, depositing aluminum or the like or attaching a triangular step or a reflection member.

Meanwhile, the light reflection portion 15 may be formed on one of the left and right end surfaces in the body portion 13.

Each of the upper surfaces of the outer peripheral surfaces 9c, 9c of the first light guide parts 9E, 9E is connected to the lower surface of the second light guide part 10E. The light incident surfaces 9a, 9a of the first light guide parts 9E, 9E are positioned more inside than the left and right end surfaces of the second light guide part 10E. Accordingly, between the light incident surfaces 9a, 9a and the left and right end surfaces of the second light guide part 10E, spaces are formed below the second light guide part 10E as arrangement spaces 21, 21, respectively.

In the arrangement spaces 21, 21, light sources 7, 7 are arranged, respectively.

When lights are emitted from the light sources 7, 7, respectively, the emitted lights enter the inside of the first light guide parts 9E, 9E from the light incident surfaces 9a, 9a of the first light guide parts 9E, 9E. The lights, which have entered the inside of the first light guide parts 9E, 9E, are reflected from the direction control reflection portions 20, 20 to be incident on the second light guide part 10E toward the left and right end surfaces of the second light guide part 10E from the outer peripheral surfaces 9c, 9c.

The lights, which have entered the second light guide part 10E from the outer peripheral surfaces 9c, 9c of the first light guide parts 9E, 9E, are reflected from the light reflection portions 15, 15 to be repeatedly guided in the left and right directions within the second light guide part 10E. The light reflected from the light reflection portions 15, 15 are reflected from the reflection steps 10a, 10a, . . . , 10a to be emitted forward from the light emitting surface 10b.

In this way, in the light guide body 8E, the lights, which have entered the second light guide part 10E from the outer peripheral surfaces 9c, 9c of the first light guide parts 9E, 9E, are internally guided in the second light guide part 10E and emitted from the second light guide part 10E. Therefore a uniform light emitting state in the second light guide part 10E can be secured.

In addition, the lights reflected from the direction control reflection portions 20, 20 of the first light guide parts 9E, 9E are incident on the second light guide part 10E and are reflected by the light reflection portions 15, 15 of the second light guide part 10E toward the inside of the second light guide part 10E. Therefore, the lights are not emitted from the opposite end surfaces of the second light guide part 10E so that the utilization efficiency of the lights can be improved.

In addition, the first light guide parts 9E, 9E and the second light guide part 10E are formed in a shape that extends in the left and right directions in unison to be arranged in a parallel state. Therefore, the size of the light guide body 8E in the vertical direction can be reduced.

Further, the light incident surfaces 9a, 9a of the first light guide parts 9E, 9E are arranged more inside than the left and right end surfaces of the second light guide part 10E, and the light sources 7, 7 are arranged in the arrangement spaces 21, 21 formed more inside than the left and right end surfaces of the second light guide part 10E.

Accordingly, since the light sources 7, 7 are not positioned on the left and right sides of the second light guide part 10E, the size of the vehicle lamp 1 can be reduced.

The configuration in which the light sources 7, 7 are arranged in such arrangement spaces 21, 21 is suitable for, for example, a structure configured by dividing the vehicle lamp 1 into upper and lower portions or left and right portions.

Figure 11:
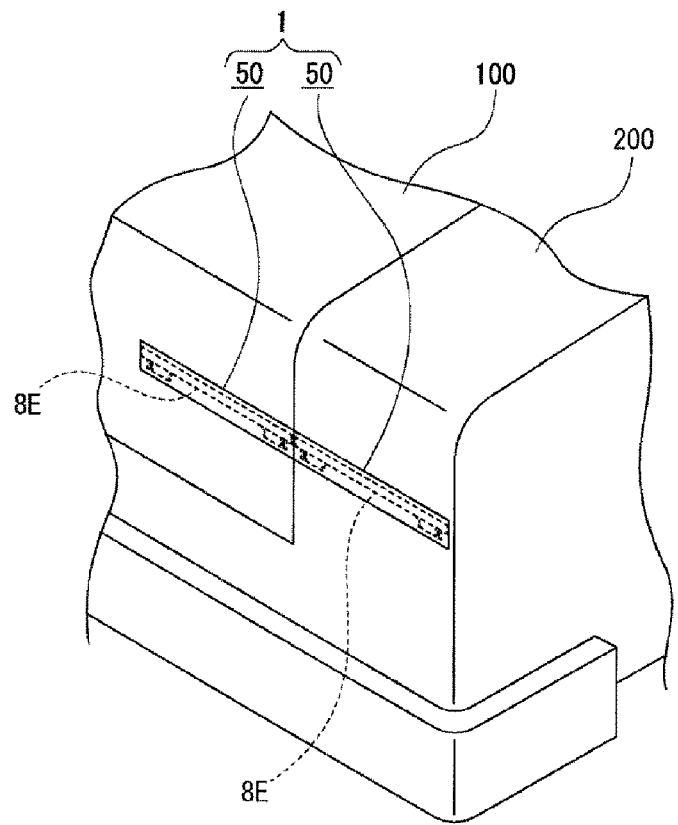
FIG. 11 is a perspective view illustrating a usage example of the light guide body according to the fifth modification.

For example, as illustrated in FIG. 11, in the case of a configuration in which a vehicle lamp 1 is divided and arranged on an outer end portion of a vehicle trunk 100 and a portion of a vehicle body 200 which is positioned outside the trunk 100, and light guide bodies 8E, 8E are arranged in both divided units 50, 50, respectively, no arrangement space of the light sources 7, 7 exists between the light guide bodies 8E, 8E.

Accordingly, the ends of the light guide bodies 8E, 8E may be positioned at the adjacent ends of the units 50, 50, respectively, so that the light guide bodies 8E, 8E can be arranged close to each other. Thus, the light emitted from each of the units 50, 50 is hardly split so that a good illumination state of the light can be secured and visibility from the outside can be improved.

Meanwhile, in the light guide body 8E, a reflection portion (not illustrated) that reflects the light emitted from the light source 7 may be formed on the lower surface of the first light guide part 9E. When such a reflection portion is formed, the utilization efficiency of the light emitted from the light source 7 can be improved.

<Sixth Modification>

Figure 12:
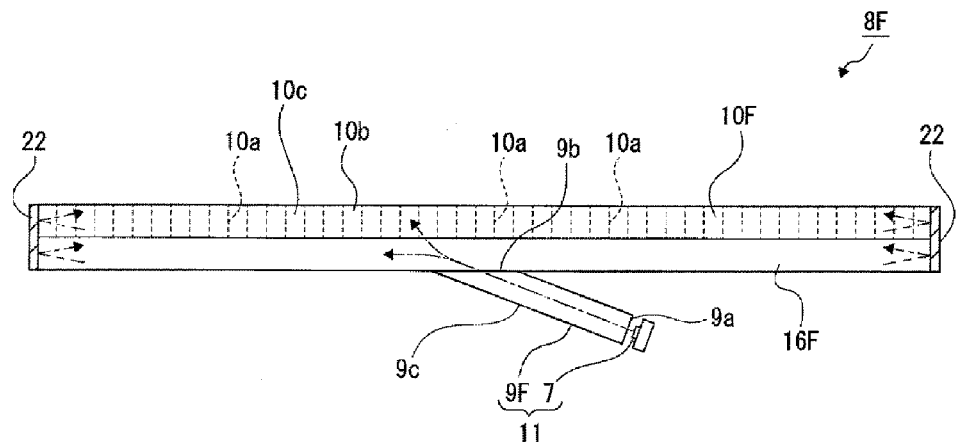
FIG. 12 is a front view illustrating a sixth modification of the light guide body.

Next, a light guide body 8F according to a sixth modification 6 will be described (see, e.g., FIG. 12).

The light guide body 8F includes a first light guide part 9, a second light guide part 10F, and a connection light guide part 16F. A light source unit 11 is constituted by the first light guide part 9 and the light source 7. The first light guide part 9 is formed in a columnar shape that is inclined in the vertical direction.

The second light guide part 10F is formed in a plate-like shape that extends in the left and right directions, and positioned above the first light guide part 9 to be spaced apart from the first light guide part 9. On the rear surface of the second light guide part 10F, the reflection steps 10a, 10a, ..., 10a are formed side by side in the left and right directions, and in the front surface of the second light guide part 10F, a portion in front of the reflection steps 10a, 10a, ..., 10a is formed as a light emitting surface 10b.

The connection light guide part 16F is positioned between the first light guide part 9 and the second light guide part 10F, and is formed in a columnar shape that extends in the left and right directions. The upper surface of the connection light guide part 16F is connected to the second light guide part 10F and the light emitting surface 9b of the first light guide part 9 is connected to the lower surface of the connection light guide part 16F.

Light reflection portions 22, 22 are formed over the left end surfaces of the second light guide part 10F and the connection light guide part 16F and the right end surfaces of the second light guide part 10F and the connection light guide part 16F, reflectively. Each light reflection portion 22 may be formed by, for example, depositing aluminum or the like, or attaching a triangular step or a reflection member.

Meanwhile, the light reflection portion 22 may be formed over the end surfaces of one of the left and right sides in the second light guide part 10F and the connection light guide part 16F.

When a light is emitted from the light source 7, the emitted light enters the inside of the first light guide part 9 from the light incident surface 9a of the first light guide part 9. The light, which has entered the inside of the first light guide part 9, is incident on the second light guide part 10F from the light emitting surface 9b through the connection light guide part 16F. In that event, at least a part of the light directed from the first light guide part 9 to the second light guide part 10F is guided in the left and right directions within the connection light guide part 16F to be incident on the second light guide part 10F.

The light, which has been incident on the second light guide part 10F from light emitting surface 9b of the first light guide part 9, is internally reflected within the second light guide part 10F to be guided in the left and right directions, and reflected from the reflection steps 10a, 10a, ..., 10a to be emitted forward from the light emitting surface 10b. In that event, the light directed to the left and right ends of the second light guide part 10F is reflected from the light reflection portions 22, 22 to be repeatedly guided in the left and right directions within the second light guide part 10F.

In this way, in the light guide body 8F, the connection light guide part 16F is provided between the first light guide part 9 and the second light guide part 10F.

Accordingly, at least a part of the light is guided in the left and right directions within the connection light guide part 16F and further guided in the left and right directions within the second light guide part 10F. Therefore, the uniformity of the light emitted forward from the light emitting surface 10b can be improved.

In addition, the light guided within the second light guide part 10F and the connection light guide part 16F is reflected toward the inside of the second light guide part 10F by the light reflection portions 22, 22. Therefore, no light is emitted from the both end surfaces of the second light guide part 10F and the connection light guide part 16F and as a result, the utilization efficiency of the light can be improved.

Meanwhile, in the light guide body 8F, the third light guide part 19 may be provided between the second light guide part 10F and the connection light guide part 16F as in the light guide body 8D according to the fourth modification.

In the case where the third light guide part 19 is provided, the light emitted from the light source 7 is incident on the second light guide part 10F through the connection light guide part 16F and the third light guide part 19, and at least a part of the light is guided in the left and right directions within the connection light guide part 16F and the third light guide part 19 to be incident on the second light guide part 10F.

In this way, when the third light guide part 19 is provided, at least a part of the light is guided in the left and right directions within the connection light guide part 16F and the third light guide part 19, and further guided in the left and right directions within the second light guide part 10F. Therefore, the uniformity of the light emitted forward from the light emitting surface 10b can be further improved.

<Seventh Modification>

Figure 13:
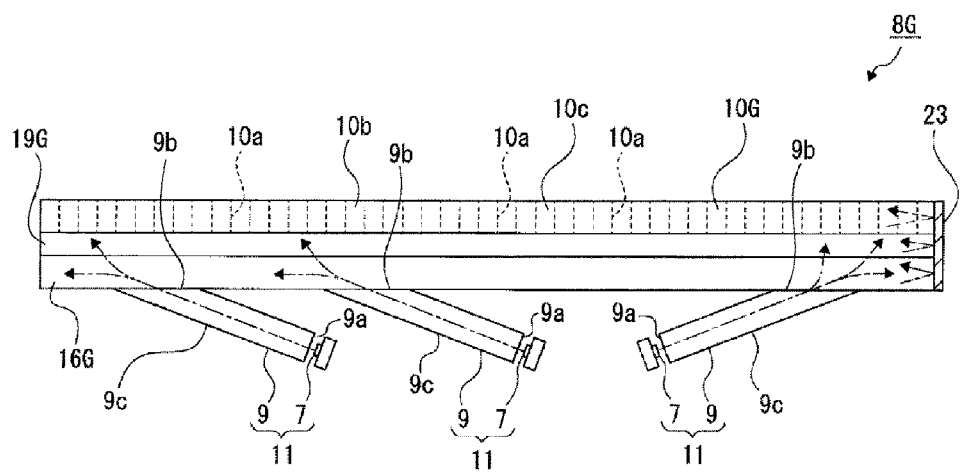
FIG. 13 is a front view illustrating a seventh modification of the light guide body.

Next, a light guide body 8G according to a seventh embodiment will be described (see, e.g., FIG. 13).

The light guide body 8G includes first light guide parts 9, 9, 9, a second light guide part 10G, a connection light guide part 16G, and a third light guide part 19G. A light source unit 11 is configured by a first light guide part 9 and a light source 7. In the first light guide parts 9, 9, 9, for example, one first light guide part 9 includes a light emitting surface 9b positioned on the left and a light incident surface 9a positioned on the right, and each of two first light guide parts 9, 9 includes a light emitting surface 9b, 9b positioned on the right and a light incident surface 9a, 9a positioned on the left.

The second light guide part 10G is formed in a columnar shape that extends in the left and right directions, and positioned above the first light guide parts 9, 9, 9 to be spaced apart from the first light guide parts 9, 9, 9. On the rear surface of the second light guide part 10G, reflection steps 10a, 10a, . . . , 10a are formed side by side in the left and right directions, and in the front surface of the second light guide part 10G, a portion in front of the reflection steps 10a, 10a, . . . , 10a is formed as a light emitting surface 10b.

The connection light guide part 16G is positioned between the first light guide parts 9, 9, 9 and the second light guide part 10G. The connection light guide part 16G is formed in a columnar shape that extends in the left and right directions. The lower surface of the connection light guide part 16G is connected to the light emitting surfaces 9b, 9b, 9b of the first light guide parts 9, 9, 9.

The third light guide part 19G is formed in a plate-like shape that extends in the left and right directions, and positioned between the second light guide part 10G and the connection light guide part 16G. The upper surface of the third light guide part 19G is connected to the lower surface of the second light guide part 10G, and the lower surface of the third light guide part 19G is connected to the upper surface of the connection light guide part 16G.

A light reflection portion 23 is formed over one side end surface of the second light guide part 10G, one side end surface of the third light guide part 19G, and one side end surface of the connection light guide part 16G. The light reflection portion 23 is formed by, for example, depositing aluminum or the like, or attaching a triangular step or a reflection member.

When lights are emitted from the light sources 7, 7, 7, the emitted lights enter the inside of the first light guide parts 9, 9, 9 from the light incident surfaces 9a, 9a, 9a of the first light guide parts 9, 9, 9, respectively. The lights, which have entered the inside of the first light guide parts 9, 9, 9, are incident on the second light guide part 10G from the light emitting surfaces 9b, 9b, 9b through the connection light guide part 16G and the third light guide part 19G.

The lights, which have been incident on the second light guide part 10G from the light emitting surfaces 9b, 9b, 9b of the first light guide parts 9, 9, 9, are internally reflected within the second light guide part 10G to be guided in the left and right directions, and reflected from the reflection steps 10a, 10a, . . . , 10a to be emitted forward from the light emitting surface 10b. In that event, at least a part of the lights directed toward the second light guide part 10G from the first light guide parts 9, 9, 9 is guided in the left and right directions within the connection light guide part 16G and the third light guide part 19G to be incident on the second light guide part 10G.

In the light guide body 8G, the light, which has been incident on the connection light guide part 16G, the third light guide part 19G, and the second light guide part 10G from one first light guide part 9 having the light emitting surface 9b positioned on the left and the light incident surface 9a positioned on the right, is reflected from the light reflection portion 23.

The lights, which have been incident on the second light guide part 10G from the light emitting surfaces 9b, 9b, 9b of the first light guide parts 9, 9, 9, are internally reflected within the second light guide part 10G to be guided in the left and right directions, and reflected from the reflection steps 10a, 10a, . . . to be emitted forward from the light emitting surface 10b.

As described above, in the light guide body 8G, a plurality of first light guide parts 9, 9, 9 are provided, and in at least one first light guide part 9, the light incident surface 9a is positioned closer to the light reflection portion 23 than the light emitting surface 9b, and in at least one of the other first light guide parts 9, 9, the light emitting surface 9b is positioned closer to the light reflection portion 23 than the light incident surface 9a.

Accordingly, there are a light incident on the second light guide part 10G without being reflected from the light reflection portion 23 and a light reflected from the light reflection portion 23 and incident on the second light guide part 10G. Therefore, a large amount of light is incident on respective portions of the second light guide part 10G without deviation, and thus the uniformity of the light emitted forward from the light emitting surface 10b can be improved.

In addition, since the light reflection portion 23 is formed, the right reflected from the light reflection portion 23 is guided from one end side to the other end side in the longitudinal direction of the second light guide part 10. Therefore, a non-emission portion does not exist in the second light guide part 10, and thus the uniformity of the light can be further improved.

<Eighth to Eleventh Modifications>

Hereinafter, other modifications of the light guide body will be simply described (see, e.g., FIGS. 14 to 17). In addition, light guide bodies 8H, 8I, 8J, 8K to be described below, according to the eighth to eleventh modifications, include first light guide parts 9, 9, . . . , 9, a second light guide part 10, a connection light guide part 16, and a third light guide part 19, and the first light guide parts 9, 9, . . . , 9, the connection light guide part 16, the third light guide part 19, and the second light guide part 10 are sequentially arranged from the bottom side. However, among these components, the third light guide part 19 may not be provided. In addition, the connection light guide part 16 may be omitted as necessary.

Figure 14:
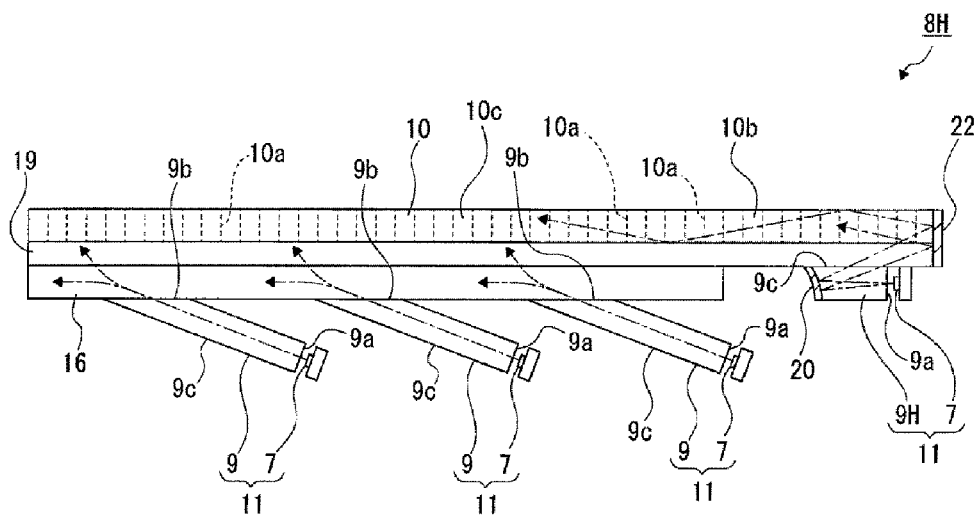
FIG. 14 is a front view illustrating an eighth modification of the light guide body.

As illustrated in FIG. 14, the light guide body 8H includes inclined first light guide parts 9, 9, 9 and a first light guide part 9H that extends in the left and right directions. The connection light guide part 16 is formed to be shorter than the second light guide part 10 and the third light guide part 19. In a space formed as the connection light guide part 16 is formed to be short, a first light guide part 9 that extends in the left and right directions and a light source 7 facing the first light guide part 9 are arranged. The first light guide part 9H is formed to have the same configuration as the first light guide part 9E, and a direction control reflection portion 20 is formed on one end surface of the first light guide part 9H. Over one end surface of the second light guide part 10 and one end surface of the connection light guide part 16, a light reflection portion 22 is formed.

In the light guide body 8H, the first light guide part 9H extending in the left and right directions and the light source 7 facing the first light guide part 9H are arranged in the space that is produced as the connection light guide part 16 is formed to be short. Therefore, size reduction can be achieved by the effective utilization of the space.

In addition, since the light reflected from the direction control reflection portion 20 is reflected toward the inside of the second light guide part 10 by the light reflection portion 22, the utilization efficiency of light can be improved and the uniformity of light emission state in the second light guide part 10 can be achieved.

Figure 15:
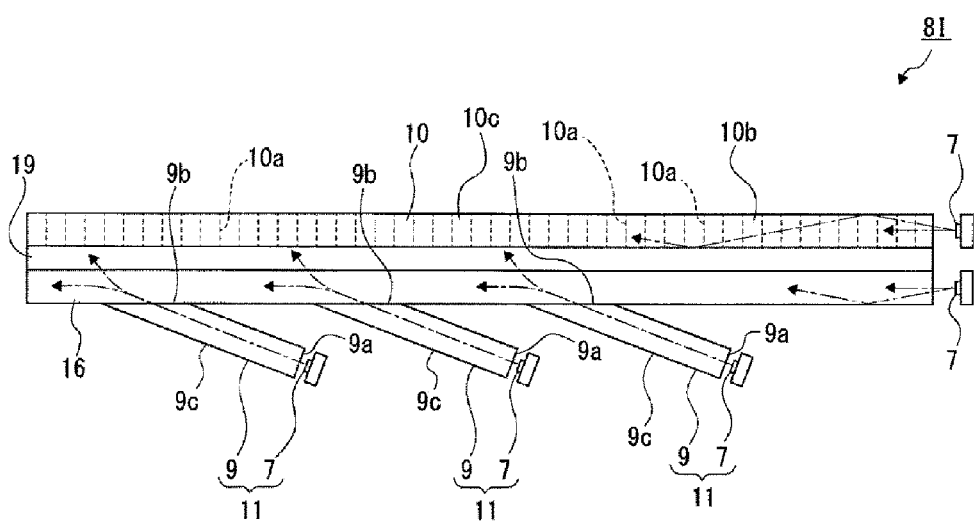
FIG. 15 is a front view illustrating a ninth modification of the light guide body.

In the light guide body 8I, as illustrated in FIG. 15, in addition to light sources 7, 7, 7 that are arranged to face the light emitting surfaces 9b, 9a, 9a of the first light guide parts 9, 9, 9, respectively, light sources 7, 7 are arranged to face one end surface of the connection light guide part 16 and one end surface of the second light guide part 10, respectively.

Accordingly, the amount of light to be emitted from the second light guide part 10 can be increased while securing the uniformity of the light emitting state.

Figure 16:
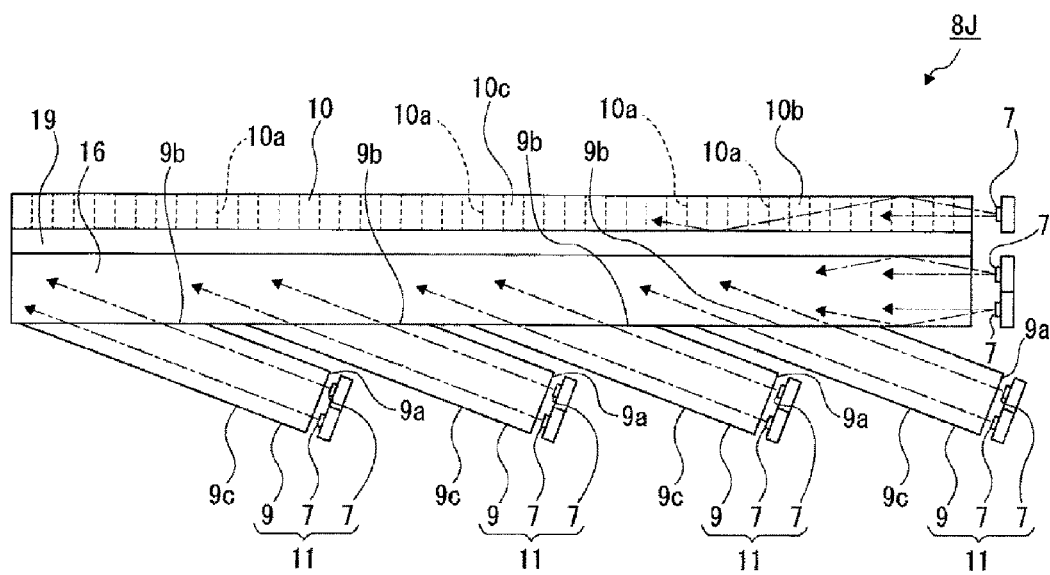
FIG. 16 is a front view illustrating a tenth modification of the light guide body.

In the light guide body 8J, as illustrated in FIG. 16, a plurality of (e.g., two) light sources 7, 7 are arranged to face the light emitting surface 9b of each first light guide part 9, two light sources 7, 7 are arranged to face one end surface of the connection light guide part 16, and one light source 7 is arranged to face one end surface of the second light guide part 10.

Accordingly, the amount of light emitted from the second light guide part 10 can be increased while securing the uniformity in light emitting state.

In addition, by properly setting the colors of the lights emitted from the light sources 7, 7, . . . , 7 and turning ON/OFF the light sources 7, 7, . . . , 7 as necessary, the light guide body 8J may be used a plurality of kinds of marker lamps. For example, by turning ON only the light sources 7, 7, . . . , 7 that face the light emitting surfaces 9b, 9b, 9b of the first light guide parts 9, 9, . . . , 9 such that a white color light is illuminated, it is possible to make the light guide body 8J function as a clearance lamp. By turning ON only the light sources 7, 7 that face the connection light guide part 16 such that an amber color light is illuminated, it is possible to make the light guide body 8J to function as a turn signal lamp. By turning ON only the light source 7 that faces the second light guide part 10 such that a white color light is illuminated, it is possible to make the light guide body 8J function as a daytime running lamp.

Meanwhile, for example, in the case where the light guide body 8J is made to function as a turn signal lamp, it is also possible to form a sequential light emitting state by causing the lights to be sequentially emitted from the light sources 7, 7, . . . , 7.

In addition, by arranging the plurality of lights sources 7 in relation to the light incident surface 9a of each first light guide part 9, the number of first light guide parts 9 can be reduced, and thus the structure may be simplified.

Meanwhile, in the light guide body 8J, the number of light sources 7 arranged in each location may be arbitrarily set.

Figure 17:
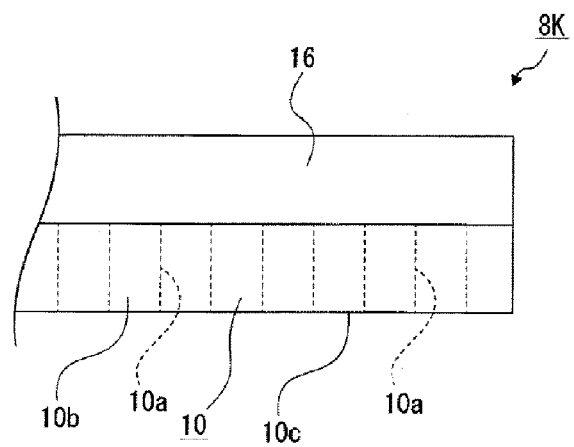
FIG. 17 is a front view illustrating an eleventh modification of the light guide body.

In the light guide body 8K, as illustrated in FIG. 17, the connection light guide part 16 is connected to the second light guide part 10 at the opposite side to the first light guide parts 9. The light guide body 8K is configured such that the light, which has been incident on the second light guide part 10 from the first light guide part 9, may enter the connection light guide part 16 first, and may then be reflected from the connection light guide part 16 to be incident on the second light guide part 10 again.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A vehicle lamp comprising:
a plurality of light source units, each of which includes a light source configured to emit light; and a first light guide part configured to internally guide the light emitted from the light source in a longitudinal direction thereof, the first light guide part including a light incident surface formed to face the light source at one end surface thereof in the longitudinal direction serving as a light guide direction and configured to incident the light emitted from the light source toward the other end surface thereof in the longitudinal direction, and a light emitting surface formed to face the light incident surface at the other end surface thereof in the longitudinal direction and configured to emit the light incident from the light incident surface; and
a second light guide part including an outer peripheral surface positioned adjacent to or connected to an outer peripheral surface of the first light guide part, a plurality of reflection steps formed side by side in a longitudinal direction on a rear surface thereof, and a light emitting surface formed in front of the plurality of reflection steps on a front surface thereof, the second light guide part being configured to internally guide the light emitted from the outer peripheral surface including the light emitting surface of the first light guide part in a longitudinal direction thereof such that the light internally guided in a longitudinal direction of the second light guide part is reflected by the plurality of reflection steps of the second light guide part to be emitted toward a forward direction from the light emitting surface of the second light guide part.

2. The vehicle lamp of claim 1, further comprising:
an optical member configured to control the light emitted from the second light guide part to be illuminated in a predetermined direction.

3. The vehicle lamp of claim 1, wherein a light reflection portion configured to reflect the light toward an inside of the second light guide part is formed on at least one end surface of the second light guide part in the light guide direction.

4. The vehicle lamp of claim 3, wherein a direction control reflection portion configured to reflect the internally guided light toward the light reflection portion is formed on the other end surface of the first light guide part in the light guide direction.

5. The vehicle lamp of claim 1, further comprising:
a connection light guide part provided between the first light guide part and the second light guide part,
wherein the connection light guide part and the first light guide part have a same thickness in a direction orthogonal to an arrangement direction of the first light guide part and the second light guide part.

6. The vehicle lamp of claim 5, further comprising:
a third light guide part provided between the second light guide part and the connection light guide part,
wherein a thickness of the third light guide part in the direction orthogonal to the arrangement direction is thinner than the thickness of the second light guide part in the direction orthogonal to the arrangement direction.

7. The vehicle lamp of claim 1, wherein the light incident surface is positioned at another end surface side rather than one end surface side of the second light guide part in the light guide direction, and
the light source is positioned between the one end surface of the second light guide part and the light incident surface to face the light incident surface.

8. The vehicle lamp of claim 1, wherein the first light guide part is provided side by side in a left and right direction of the vehicle lamp, and
   each of the plurality of the first light guide parts is formed in a columnar shape that is inclined in a vertical direction.

9. The vehicle lamp of claim 1, wherein an inclination angle of the first light guide part is set to be 5° to 45° with reference to a horizontal direction.

10. The vehicle lamp of claim 1, wherein each light source included in the plurality of light source units is arranged side by side in a longitudinal direction of the vehicle lamp, and
    the light is sequentially emitted from the each light source in a longitudinal direction of the vehicle lamp such that the light is visually recognized as if the light is flowing in the longitudinal direction of the vehicle lamp.

11. A vehicle lamp comprising:
    a light source configured to emit light;
    a first light guide part configured to internally guide the light emitted from the light source in a longitudinal direction thereof, the first light guide part including a light incident surface formed to face the light source at one end surface thereof in the longitudinal direction serving as a light guide direction and configured to incident the light emitted from the light source toward the other end surface thereof in the longitudinal direction, and a light emitting surface formed to face the light incident surface at the other end surface thereof in the longitudinal direction and configured to emit the light incident from the light incident surface;
    a connection light guide part having an outer peripheral surface positioned adjacent to or connected to the light emitting surface and configured to internally guide the light emitted from the light emitting surface of the first light guide part; and
    a second light guide part positioned opposite to the first light guide part with the connection light guide part being interposed therebetween and including a plurality of reflection steps formed side by side in a longitudinal direction on a rear surface thereof, and a light emitting surface formed in front of the plurality of reflection steps on a front surface thereof, the second light guide part being configured to internally guide the light emitted from the outer peripheral surface of the connection light guide part in a longitudinal direction thereof such that the light internally guided in a longitudinal direction of the second light guide part is reflected by the plurality of reflection steps of the second light guide part to be emitted toward forward direction from the light emitting surface of the second light guide part.

12. The vehicle lamp of claim 11, wherein a light reflection portion configured to reflect the light toward the inside of the second light guide part is formed on at least one end surface of the second light guide part and the connection light guide part in the light guide direction.

13. The vehicle lamp of claim 12, wherein a plurality of first light guide parts are provided,
    in at least one of the first light guide parts, the light incident surface is positioned closer to the light reflection portion than the light emitting surface, and
    in at least one of other first light guide parts, the light emitting surface is positioned closer to the light reflection portion than the light incident surface.

14. The vehicle lamp of claim 11, further comprising:
    a third light guide part provided between the second light guide part and the connection light guide part,
    wherein a thickness of the third light guide part in the direction orthogonal to the arrangement direction is thinner than the thickness of the second light guide part in the direction orthogonal to the arrangement direction.

15. The vehicle lamp of claim 11, wherein the first light guide part is provided side by side in a longitudinal direction of the vehicle lamp, and
    the first light guide part is formed in a columnar shape that is inclined in a vertical direction.

16. The vehicle lamp of claim 11, wherein an inclination angle of the first light guide part is set to be 5° to 45° with reference to a horizontal direction.

17. The vehicle lamp of claim 11, wherein a plurality of the light sources are arranged side by side in a longitudinal direction of the vehicle lamp, and
    the light is sequentially emitted from each of the plurality of the light sources in a longitudinal direction of the vehicle lamp such that the light is visually recognized as if the light is flowing in the longitudinal direction of the vehicle lamp.

* * * * *